(12) United States Patent
Nishida

(10) Patent No.: US 11,101,469 B2
(45) Date of Patent: Aug. 24, 2021

(54) POWER GENERATING CELL

(71) Applicant: HONDA MOTOR CO., LTD., Tokyo (JP)

(72) Inventor: Yosuke Nishida, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 107 days.

(21) Appl. No.: 16/232,178

(22) Filed: Dec. 26, 2018

(65) Prior Publication Data

US 2019/0198889 A1 Jun. 27, 2019

(30) Foreign Application Priority Data

Dec. 27, 2017 (JP) .............................. JP2017-250906

(51) Int. Cl.

| H01M 8/026 | (2016.01) |
|---|---|
| H01M 8/0276 | (2016.01) |
| H01M 8/0273 | (2016.01) |
| H01M 8/1004 | (2016.01) |
| H01M 8/0206 | (2016.01) |

(Continued)

(52) U.S. Cl.
CPC ......... H01M 8/026 (2013.01); H01M 8/0206 (2013.01); H01M 8/0247 (2013.01); H01M 8/0273 (2013.01); H01M 8/0276 (2013.01); H01M 8/1004 (2013.01); H01M 8/1065 (2013.01); H01M 8/1067 (2013.01); H01M 8/0263 (2013.01); H01M 2008/1095 (2013.01)

(58) Field of Classification Search
CPC .. H01M 8/026; H01M 8/0206; H01M 8/1065; H01M 8/1067; H01M 8/0247; H01M 8/0276; H01M 8/0273; H01M 8/1004; H01M 8/0263; H01M 2008/1095

See application file for complete search history.

(56) References Cited

U.S. PATENT DOCUMENTS

| 2007/0003810 A1* | 1/2007 | Heystek | .............. | H01M 8/0258 |
| | | | | 429/480 |
| 2017/0117559 A1* | 4/2017 | Yamano | .............. | H01M 8/1018 |

FOREIGN PATENT DOCUMENTS

| JP | 5239091 | 7/2013 |
| JP | 2016-018587 | 2/2016 |

(Continued)

OTHER PUBLICATIONS

Yamano et al., Application JP2015-208404: Fuel Cell, Oct. 2015, Global Dossier; Provided are the Request for a Patent, Abstract, Description, Claims, and Drawings (Year: 2015).*

(Continued)

*Primary Examiner* — Milton I Cano
*Assistant Examiner* — Jenna Shulman
(74) *Attorney, Agent, or Firm* — Amin, Turocy & Watson, LLP

(57) ABSTRACT

In a power generating cell, on a surface on a side opposite from an electrolyte membrane in an anode, there are provided an outer peripheral surface positioned on an outer peripheral portion of the anode, a central surface located more inwardly than an inner peripheral portion of a resin frame member, and a stepped portion connecting the outer peripheral surface and the central surface to each other. A height of the central surface from the electrolyte membrane is lower than that of the outer peripheral surface. A protruding end surface of an end linear protrusion is in contact with the central surface.

9 Claims, 7 Drawing Sheets

(51) Int. Cl.
*H01M 8/1065* (2016.01)
*H01M 8/1067* (2016.01)
*H01M 8/0247* (2016.01)
*H01M 8/0263* (2016.01)
*H01M 8/1018* (2016.01)

(56) References Cited

FOREIGN PATENT DOCUMENTS

| | | |
|---|---|---|
| JP | 2016-025053 | 2/2016 |
| JP | 2017-139218 | 8/2017 |
| WO | 2009-043600 | 4/2009 |
| WO | 2015/126748 | 8/2015 |

OTHER PUBLICATIONS

Japanese Office Action for Japanese Patent Application No. 2017-250906 dated Jun. 18, 2019.
Fuel Cell Technology, "Issues and Approaches in Solid-Polymer-Type", published by Tokyo Denki University Press, First Edition, pp. 46.

\* cited by examiner

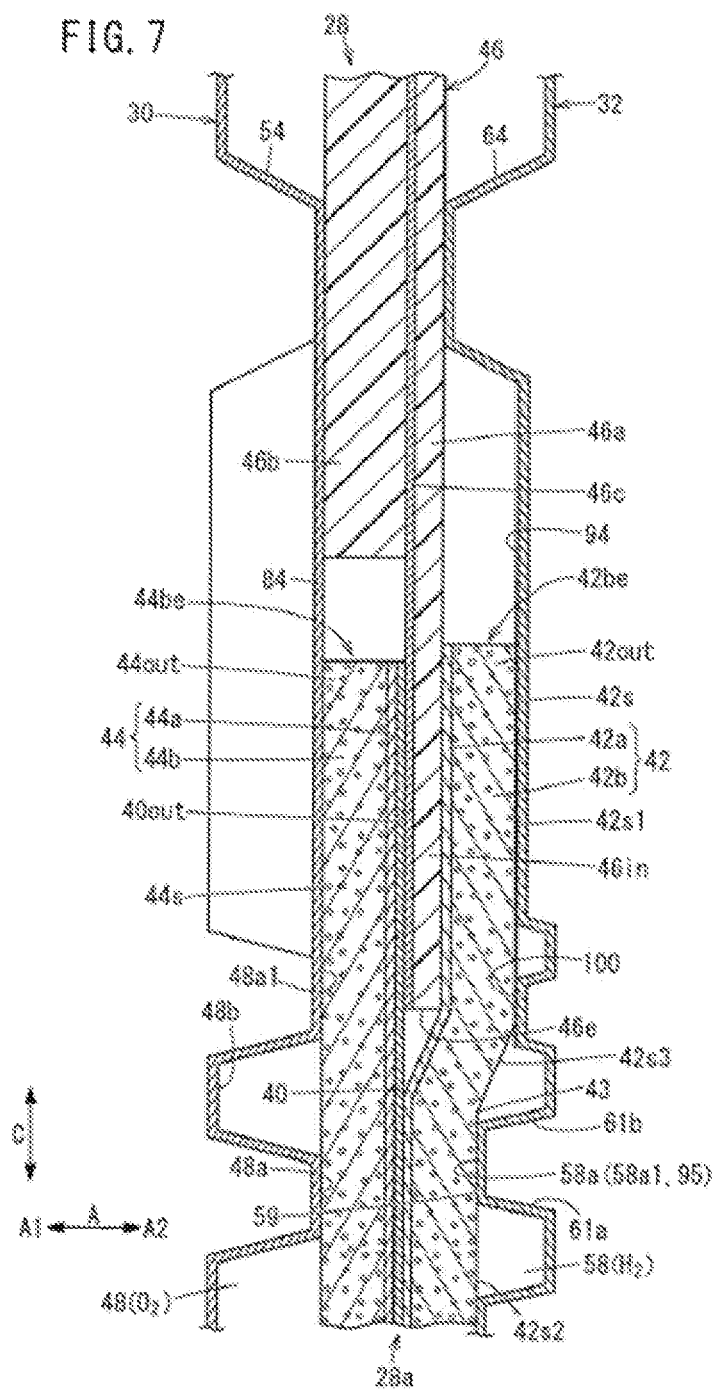

POWER GENERATING CELL

CROSS-REFERENCE TO RELATED APPLICATION

This application is based upon and claims the benefit of priority from Japanese Patent Application No. 2017-250906 filed on Dec. 27, 2017, the contents of which are incorporated herein by reference.

BACKGROUND OF THE INVENTION

Field of the Invention

The present invention relates to a power generating cell equipped with metal separators in which there are provided bead seals and reaction gas flow fields.

Description of the Related Art

A fuel cell is equipped with an electrolyte electrode assembly, for example, a membrane electrode assembly (MEA), in which electrodes are provided on both sides of a solid polymer electrolyte membrane. The MEA is sandwiched and gripped between metal separators (bipolar plates) to thereby form a power generating cell (unit fuel cell). By stacking a predetermined number of such power generating cells, the power generating cells are used, for example, as a vehicle fuel cell stack.

Reaction gas flow fields, which allow reaction gases to flow from one end to the other end of the metal separators along power generating surfaces of the MEA, are formed in the metal separators of this type of power generating cell (see, for example, Japanese Patent No. 5239091). The reaction gas flow fields include a plurality of linear protrusions extending from one end to the other end of the metal separators, and a plurality of flow field grooves formed between the plurality of linear protrusions.

SUMMARY OF THE INVENTION

Incidentally, a power generating cell exists which is equipped with a resin frame member that protrudes outwardly in a state of being sandwiched between outer peripheral portions of the electrodes and which surrounds the outer peripheral portions. In such a power generating cell, on surfaces of the electrodes on sides thereof facing toward the electrolyte membrane, there are provided stepped portions connecting outer peripheral surfaces located at the outer peripheral portions, and central surfaces located more inwardly than an inner end of the resin frame member and having a height from the electrolyte membrane lower than that of the outer peripheral surfaces.

In this case, among the plurality of linear protrusions, when the outer peripheral surfaces are contacted, in a state in which protruding end surfaces of end linear protrusions (surfaces at the distal ends of the protrusions), which are positioned at ends of the reaction gas flow fields in the flow field widthwise direction, are spaced apart from the central surfaces, gaps (bypass flow passages) are formed between the central surfaces and the protruding end surfaces of the end linear protrusions. When this occurs, among the plurality of flow field grooves, the reaction gases, which flow through the end flow field grooves positioned at the ends of the reaction gas flow fields in the flow field widthwise direction, are guided into the bypass flow passages, and there is a concern that the flow rate of the reaction gases flowing inside the end flow field grooves may decrease.

The present invention has been devised taking into consideration the aforementioned problems, and has the object of providing a power generating cell which is capable of suppressing a decrease in the flow rate of reaction gases that flow inside of end flow field grooves.

In order to achieve the aforementioned object, a power generating cell is provided comprising a membrane electrode assembly on which electrodes are provided on both sides of an electrolyte membrane, metal separators disposed on both sides of the membrane electrode assembly, and a resin frame member protruding outwardly from outer peripheral portions of the electrodes and surrounding the outer peripheral portions of the electrodes in a state of being sandwiched between the outer peripheral portion of one of the electrodes and the outer peripheral portion of another of the electrodes, wherein reaction gas flow fields are formed therein having a plurality of linear protrusions extending from one end to another end of the metal separators, and a plurality of linear flow field grooves formed between the plurality of linear protrusions, and which are configured to allow reaction gases to flow along power generating surfaces thereof from the one end to the other end, and in the power generating cell, seals are provided to surround the reaction gas flow fields and are configured to prevent leakage of the reaction gases, wherein on a surface on an opposite side from the electrolyte membrane on one of the electrodes, there are provided an outer peripheral surface positioned on an outer peripheral portion of the one of the electrodes, a central surface located more inwardly than an inner end of the resin frame member, and a stepped portion connecting the outer peripheral surface and the central surface to each other, wherein a height of the central surface from the electrolyte membrane is lower than that of the outer peripheral surface, and among the plurality of linear protrusions, a protruding end surface of an end linear protrusion, which is positioned at an end of the reaction gas flow field in the flow field widthwise direction, is in contact with the central surface.

In the above-described power generating cell, the protruding end surface of the end linear protrusion preferably is in contact with the central surface over an entire length of the end linear protrusion.

In the above-described power generating cell, the protruding end surface of the end linear protrusion preferably is positioned on or in vicinity of a boundary between the central surface and the stepped portion.

In the above-described power generating cell, each of the linear flow field grooves preferably extends in a wavy shape, a first side wall of the end linear protrusion near the linear flow field grooves preferably extends in a wavy shape along the linear flow field grooves, and a second side wall of the end linear protrusion opposite from the linear flow field grooves preferably extends in a straight line shape along the boundary.

In the above-described power generating cell, on at least one of the metal separators, a bypass stopping convex portion, which is configured to prevent bypassing of the reaction gas, preferably is provided between the seal and the end linear protrusion, and is in contact with the outer peripheral surface.

In the above-described power generating cell, the seals preferably are bead seals which are formed in a bulging manner on the metal separators.

In the above-described power generating cell, the end linear protrusion preferably comprises a concave curved portion in which the first side wall is curved so as to be recessed with respect to the seal, and a convex curved portion in which the first side wall is curved in a projecting manner toward the seal.

In the above-described power generating cell, on the metal separator facing toward the one of the electrodes, a bypass stopping convex portion, which is configured to prevent bypassing of the reaction gas, preferably is provided between the seal and the end linear protrusion, and is in contact with the outer peripheral surface, and the bypass stopping convex portion preferably comprises a first convex portion provided between the seal and the concave curved portion, and a second convex portion provided between the seal and the convex curved portion.

In the above-described power generating cell, the first convex portion preferably is connected to the seal.

In the above-described power generating cell, the second convex portion preferably is connected respectively to the seal and to the end linear protrusion.

In the above-described power generating cell, an intermediate convex portion configured to support an outer peripheral portion of the membrane electrode assembly is provided between the first convex portion and the second convex portion.

In accordance with the power generating cell of the present invention, since gaps that act as bypass flow passages are not formed between the protruding end surfaces of the end linear protrusions and the central surfaces of the electrodes, it is possible to suppress a decrease in the flow rate of the reaction gases inside the end linear flow field grooves.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 7 is a cross-sectional view taken along line VII-VII of FIG. 4.

DESCRIPTION OF THE PREFERRED EMBODIMENTS

A preferred embodiment of a power generating cell according to the present invention will be presented and described below with reference to the accompanying drawings.

Figure 1:
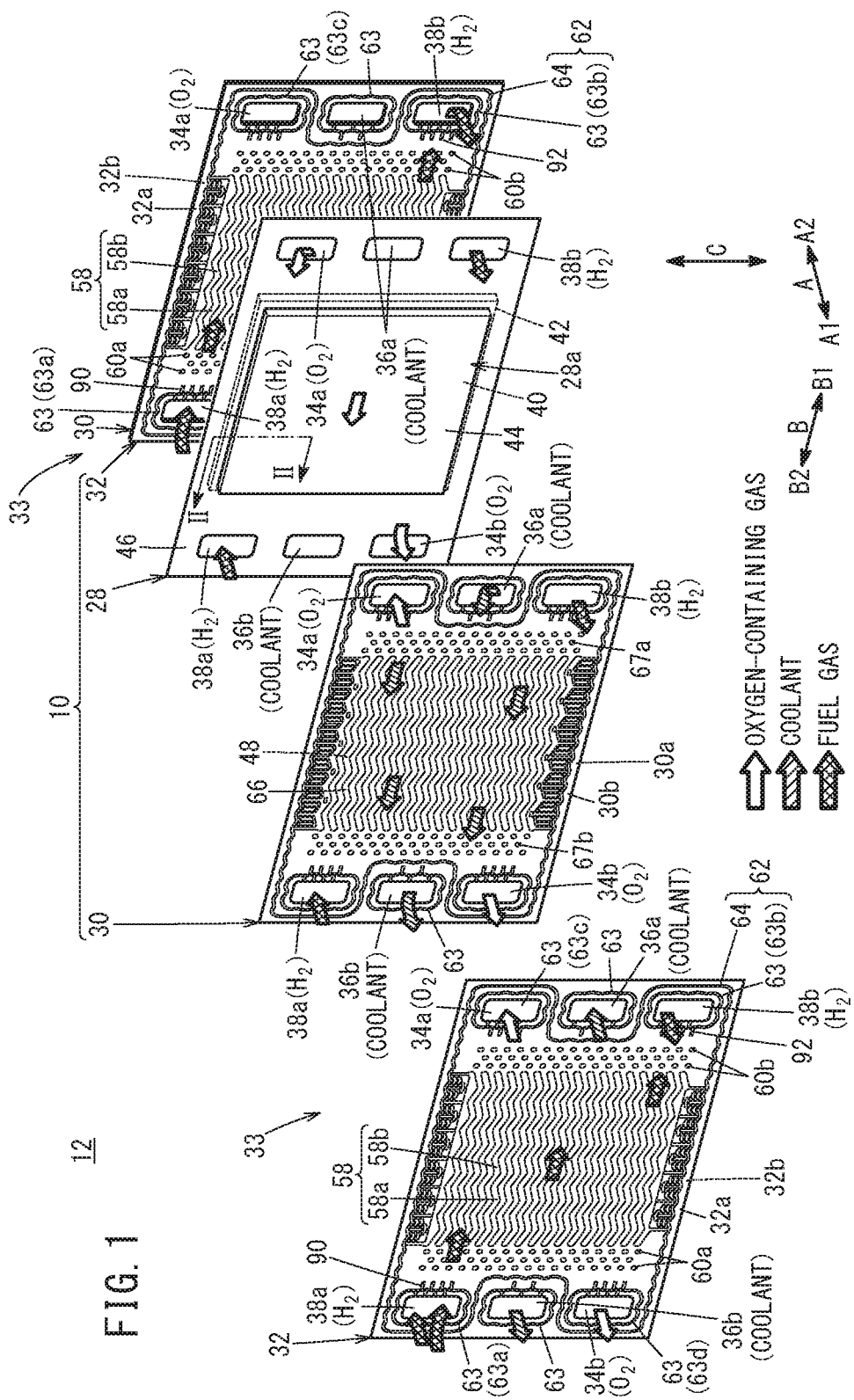
FIG. 1 is an exploded perspective view of a power generating cell according to an embodiment of the present invention.

A power generating cell 10 that makes up a unit fuel cell shown in FIG. 1 comprises a resin frame member equipped MEA 28, a first metal separator 30 disposed on one side surface (a side in the direction of the arrow A1) of the resin frame member equipped MEA 28, and a second metal separator 32 disposed on another side surface (a side in the direction of the arrow A2) of the resin frame member equipped MEA 28. A plurality of the power generating cells 10 are stacked, for example, in the direction of the arrow A (a horizontal direction), or in the direction of the arrow C (the direction of gravity), and a tightening load (compressive load) in the stacking direction is imparted to thereby make up a fuel cell stack 12. The fuel cell stack 12 is mounted, for example, as a vehicle incorporated fuel cell stack in a fuel cell electric vehicle (not shown).

The first metal separator 30 and the second metal separator 32, for example, are made of metal plates such as steel plates, stainless steel plates, aluminum plates, plated steel plates, or metal plates having anti-corrosive surfaces produced by performing a surface treatment. The first metal separator 30 and the second metal separator 32 are formed in wavy shapes in cross section by press forming. In mutually adjacent ones of the power generating cells 10, the first metal separator 30 of one power generating cell 10, and the second metal separator 32 of another power generating cell 10 are joined together integrally by welding, brazing, caulking or the like at the outer peripheral portion thereof to thereby constitute a joined separator 33.

At one end edge portion of the power generating cell 10 (an edge portion in the direction of the arrow B1) in the horizontal direction which is the longitudinal direction of the power generating cell 10, an oxygen-containing gas supply passage 34a, a coolant supply passage 36a, and a fuel gas discharge passage 38b are provided. The oxygen-containing gas supply passage 34a, the coolant supply passage 36a, and the fuel gas discharge passage 38b are arranged in a vertical direction (in the direction of the arrow C). An oxygen containing gas is supplied through the oxygen-containing gas supply passage 34a. A coolant, for example, water, is supplied through the coolant supply passage 36a. A fuel gas, for example, a hydrogen-containing gas, is discharged through the fuel gas discharge passage 38b.

At the other end edge portion of the power generating cell 10 (an edge portion in the direction of the arrow B2), a fuel gas supply passage 38a for supplying the fuel gas, a coolant discharge passage 36b for discharging the coolant, and an oxygen-containing gas discharge passage 34b for discharging the oxygen-containing gas are provided. The fuel gas supply passage 38a, the coolant discharge passage 36b, and the oxygen-containing gas discharge passage 34b are arranged sequentially in the vertical direction. The fuel gas is supplied through the fuel gas supply passage 38a. The coolant is discharged through the coolant discharge passage 36b. The oxygen-containing gas is discharged through the oxygen-containing gas discharge passage 34b. The arrangement of the oxygen-containing gas supply passage 34a and the oxygen-containing gas discharge passage 34b, as well as the fuel gas supply passage 38a and the fuel gas discharge passage 38b is not limited to that shown for the present embodiment, and may be set appropriately depending on required specifications.

Figure 2:
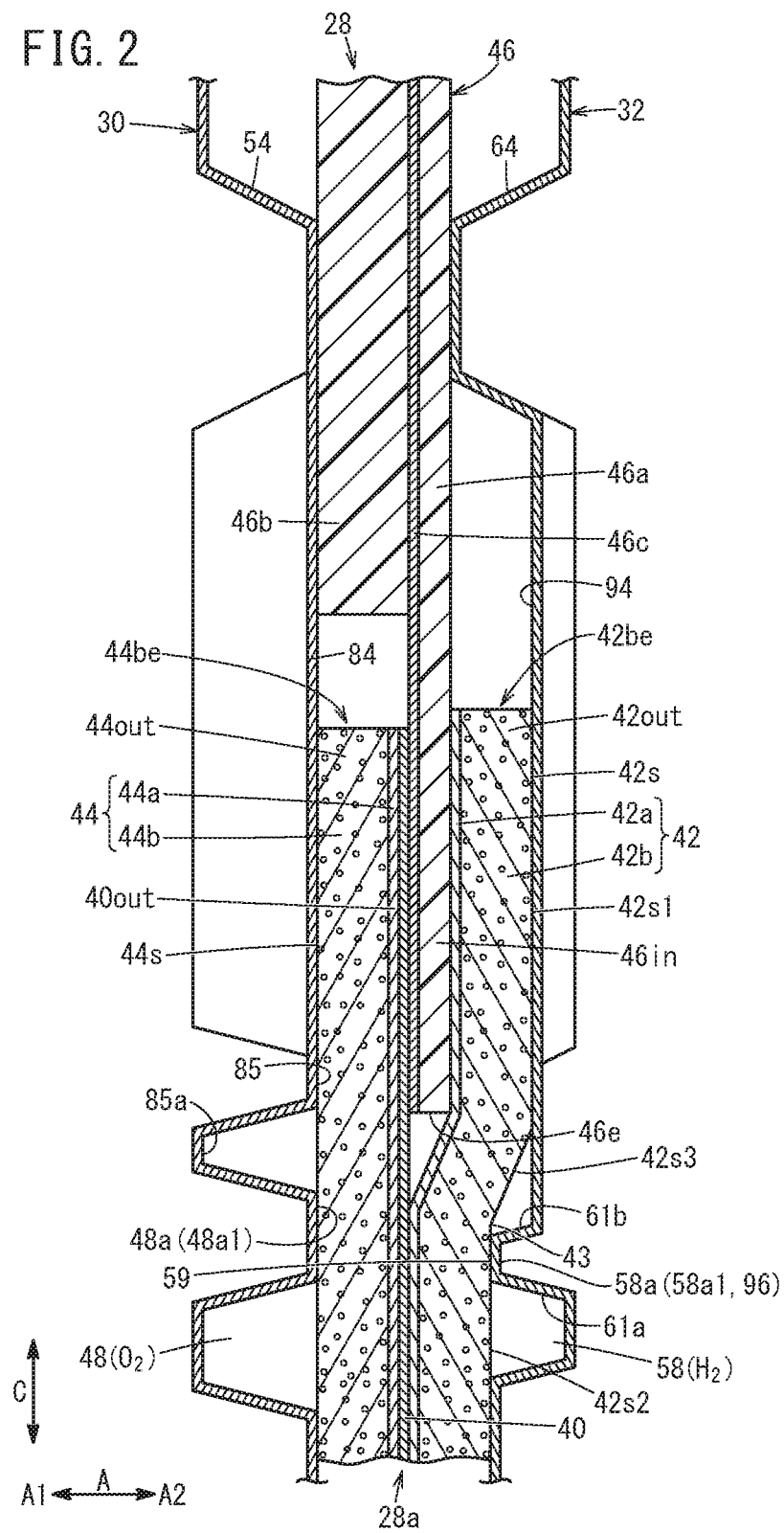
FIG. 2 is a cross-sectional view of the power generating cell taken along line II-II in FIGS. 1 and 4.

As shown in FIG. 2, the resin frame member equipped MEA 28 comprises a membrane electrode assembly (hereinafter referred to as an "MEA 28a"), and a frame-shaped resin frame member 46 provided on the outer peripheral portion of the MEA 28a.

The MEA 28a includes an electrolyte membrane 40, and an anode 42 and a cathode 44 sandwiching the electrolyte membrane 40 therebetween. The electrolyte membrane 40 is a solid polymer electrolyte membrane (cation ion exchange membrane). The solid polymer electrolyte membrane is formed by impregnating a thin membrane of perfluorosulfonic acid with water, for example. The electrolyte membrane 40 is sandwiched and gripped between an outer peripheral portion 42*out* of the anode 42 and an outer peripheral portion 44*out* of the cathode 44. A fluorine based electrolyte may be used as the electrolyte membrane 40. Alternatively, an HC (hydrocarbon) based electrolyte may be used as the electrolyte membrane 40.

The cathode 44 includes a first electrode catalyst layer 44*a* bonded to one surface of the electrolyte membrane 40, and a first gas diffusion layer 44*b* laminated on the first electrode catalyst layer 44*a*. The anode 42 includes a second electrode catalyst layer 42*a* bonded to another surface of the electrolyte membrane 40, and a second gas diffusion layer 42*b* laminated on the second electrode catalyst layer 42*a*.

The first electrode catalyst layer 44*a* and the second electrode catalyst layer 42*a* are formed on opposite surfaces of the electrolyte membrane 40. The first electrode catalyst layer 44*a* is formed, for example, by uniformly coating porous carbon particles with a platinum alloy supported on surfaces thereof, onto the surface of the first gas diffusion layer 44*b* together with an ionic conductive polymer binder. The second electrode catalyst layer 42*a* is formed, for example, by uniformly coating porous carbon particles with a platinum alloy supported on surfaces thereof, onto the surface of the second gas diffusion layer 42*b* together with an ionic conductive polymer binder. The first gas diffusion layer 44*b* and the second gas diffusion layer 42*b* are formed of carbon paper, carbon cloth, or the like.

As shown in FIG. 1, at an edge portion of the resin frame member 46 on a side in the direction of the arrow B1, the oxygen-containing gas supply passage 34*a*, the coolant supply passage 36*a*, and the fuel gas discharge passage 38*b* are provided. At an edge portion of the resin frame member 46 in the direction of the arrow B2, the fuel gas supply passage 38*a*, the coolant discharge passage 36*b*, and the oxygen-containing gas discharge passage 34*b* are provided.

As shown in FIG. 2, the resin frame member 46 includes a first frame-shaped sheet 46*a*, an inner peripheral portion of which is joined to the outer peripheral portion of the MEA 28*a*, and a second frame-shaped sheet 46*b* that is joined to the first frame-shaped sheet 46*a*. The first frame-shaped sheet 46*a* and the second frame-shaped sheet 46*b* are joined to each other in a thickness direction by an adhesive layer 46*c* made up from an adhesive substance. The second frame-shaped sheet 46*b* is joined to an outer peripheral portion of the first frame-shaped sheet 46*a*. The second frame-shaped sheet 46*b* is thicker than the thickness of the first frame-shaped sheet 46*a*. The thickness of the second frame-shaped sheet 46*b* may also be the same as the thickness of the first frame-shaped sheet 46*a*.

The first frame-shaped sheet 46*a* and the second frame-shaped sheet 46*b* are made of a resin material having an electrical insulating ability. Examples of materials of the first frame-shaped sheet 46*a* and the second frame-shaped sheet 46*b* include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

An inner peripheral portion 46*in* of the resin frame member 46 (inner peripheral portion of the first frame-shaped sheet 46*a*) is sandwiched and gripped between the outer peripheral portion 42*out* of the anode 42 and the outer peripheral portion 44*out* of the cathode 44. More specifically, the inner peripheral portion 46*in* of the resin frame member 46 is sandwiched between an outer peripheral portion 40*out* of the electrolyte membrane 40 and the outer peripheral portion 42*out* of the anode 42. The inner peripheral portion 46*in* of the resin frame member 46 and the outer peripheral portion 40*out* of the electrolyte membrane 40 are joined via the adhesive layer 46*c*. Moreover, the inner peripheral portion 46*in* of the resin frame member 46 may be sandwiched between the outer peripheral portion 40*out* of the electrolyte membrane 40 and the outer peripheral portion 44*out* of the cathode 44.

On a surface 42*s* on a side opposite from the electrolyte membrane 40 within the anode 42, there are provided an outer peripheral surface 42*s*1 positioned on an outer peripheral portion 42*out* of the anode 42, a central surface 42*s*2 positioned more inwardly than an inner end 46*e* of the resin frame member 46, and a stepped portion 42*s*3 connecting the outer peripheral surface 42*s*1 and the central surface 42*s*2 to each other.

The outer peripheral surface 42*s*1 and the central surface 42*s*2 are flat surfaces lying parallel to the power generating surfaces of the MEA 28*a*. The central surface 42*s*2 is positioned more closely to the side of the cathode 44 than the outer peripheral surface 42*s*1. The stepped portion 42*s*3 is an inclined surface which is inclined on the side of the MEA 28*a* from the outer peripheral surface 42*s*1 toward the central surface 42*s*2. A surface 44*s* of the cathode 44 on a side opposite from the electrolyte membrane 40 is a flat surface lying parallel to the power generating surfaces of the MEA 28*a*. A stepped portion, which is similar to the stepped portion 42*s*3 on the side of the anode 42, may also be formed on the side of the cathode 44.

Figure 3:
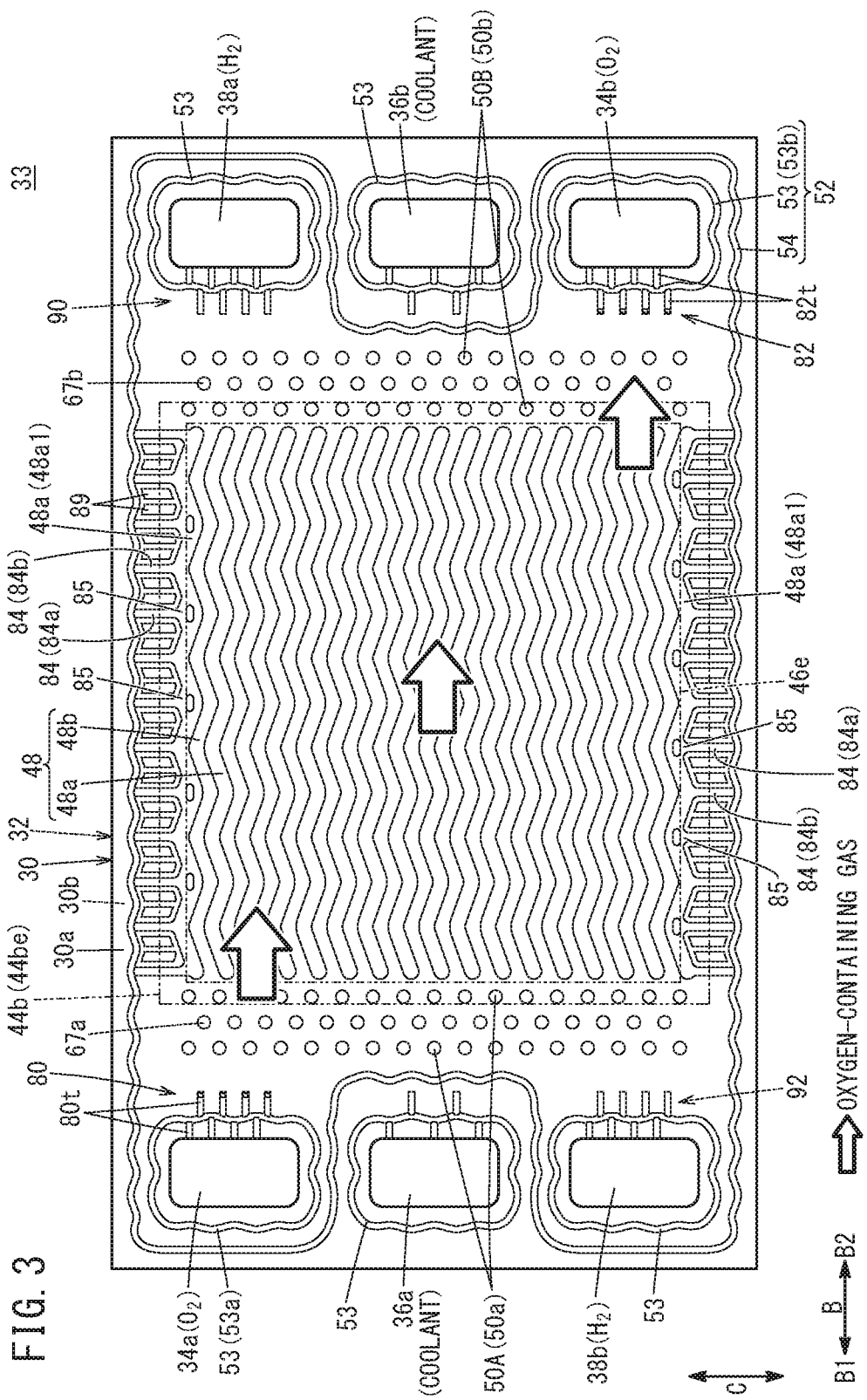
FIG. 3 is a plan view of the power generating cell as viewed from the side of a first metal separator.

As shown in FIG. 3, an oxygen-containing gas flow field 48 extending in the direction of the arrow B, for example, is disposed on a surface 30*a* (referred to hereinafter as a "front surface 30*a*") of the first metal separator 30 facing toward the resin frame member equipped MEA 28.

The oxygen-containing gas flow field 48 communicates fluidically with the oxygen-containing gas supply passage 34*a* and the oxygen-containing gas discharge passage 34*b*. The oxygen-containing gas flow field 48 includes a plurality of wave-shaped linear flow field grooves 48*b* disposed between a plurality of wave-shaped linear protrusions 48*a* that extend in the direction of the arrow B. Accordingly, in the oxygen-containing gas flow field 48, a plurality of the linear protrusions 48*a* and a plurality of the linear flow field grooves 48*b* are alternately arranged in the flow field widthwise direction (the direction of the arrow C). Each of the linear protrusions 48*a* and each of the linear flow field grooves 48*b* extend in wavy shapes, but may extend in a straight line shape.

Side walls on both sides in the widthwise direction (the direction of the arrow C) of the linear protrusions 48*a* are inclined with respect to the thickness direction of the separators, and the cross-sectional shape of the linear protrusions 48*a* is trapezoidal. The side walls on both sides in the widthwise direction of the linear protrusions 48*a* may be parallel to the thickness direction of the separators, and the cross-sectional shape of the linear protrusions 48*a* may be rectangular.

Hereinafter, among the plurality of linear protrusions 48*a*, those which are positioned at both ends in the flow field widthwise direction will be referred to as "end linear protrusions 48*a*1". The end linear protrusions 48*a*1 are disposed inside of an outer edge 44*be* of the first gas diffusion layer 44*b*.

On the front surface 30a of the first metal separator 30, an inlet buffer 50A having a plurality of boss arrays composed of a plurality of bosses 50a aligned in the direction of the arrow C is disposed between the oxygen-containing gas supply passage 34a and the oxygen-containing gas flow field 48. Further, on the front surface 30a of the first metal separator 30, an outlet buffer 50B having a plurality of boss arrays composed of a plurality of bosses 50b is disposed between the oxygen-containing gas discharge passage 34b and the oxygen-containing gas flow field 48.

Moreover, on a surface 30b of the first metal separator 30 on an opposite side from the oxygen-containing gas flow field 48, boss arrays composed of a plurality of bosses 67a aligned in the direction of the arrow C are provided between the above-described boss arrays of the inlet buffer 50A, and together therewith, boss arrays composed of a plurality of bosses 67b aligned in the direction of the arrow C are provided between the above-described boss arrays of the outlet buffer 50B (see FIG. 1). The bosses 67a, 67b which project at the side of the coolant surface constitute buffer sections on the side of the coolant surface.

First seal lines 52, which are formed as bead seals by press forming, are formed to project or bulge out toward the resin frame member equipped MEA 28 (see FIG. 1) on the front surface 30a of the first metal separator 30. The first seal lines 52 need not necessarily be bead seals, but may be rubber seals having elasticity, which are integrally or separately provided on the first metal separator 30. Although not shown in detail, on a projecting end surface of the first seal lines 52, a resin material may be fixed and attached thereto by printing or coating, etc. Such a resin material need not necessarily be used.

The first seal lines 52 include a plurality of bead seals (hereinafter referred to as "passage beads 53") that individually surround the plurality of communication passages (the oxygen-containing gas supply passage 34a, etc.), and a bead seal (hereinafter referred to as an "outer peripheral bead 54") that surrounds the oxygen-containing gas flow field 48, the inlet buffer 50A, and the outlet buffer 50B.

The plurality of passage beads 53 project out toward the MEA 28a from the front surface 30a of the first metal separator 30, together with individually surrounding, respectively, the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b. Hereinafter, among the plurality of passage beads 53, the one that surrounds the oxygen-containing gas supply passage 34a will be referred to as a "passage bead 53a", and the one that surrounds the oxygen-containing gas discharge passage 34b will be referred to as a "passage bead 53b".

On the first metal separator 30, bridge sections 80, 82 are provided, which enable communication between inner sides (on the side of the oxygen-containing gas supply passage 34a and the oxygen containing gas discharge passage 34b) and outer sides (on the side of the oxygen-containing gas flow field 48) of the passage beads 53a, 53b. The bridge sections 80 are provided on a side portion of the passage bead 53a surrounding the oxygen-containing gas supply passage 34a on the side of the oxygen-containing gas flow field 48. The bridge sections 82 are provided on a side portion of the passage bead 53b surrounding the oxygen-containing gas discharge passage 34b on the side of the oxygen-containing gas flow field 48.

The bridge sections 80, 82 include a plurality of tunnels 80t, 82t provided respectively on the inside and the outside of the passage beads 53a, 53b. The tunnels 80t, 82t are formed by press forming to protrude from the front surface 30a of the first metal separator 30 and toward the resin frame member equipped MEA 28.

Between both end portions in the flow field widthwise direction (the end linear protrusions 48a1) of the oxygen-containing gas flow field 48 and the outer peripheral bead 54, first bypass stopping convex portions 84 are provided for preventing bypassing of the oxygen-containing gas from the oxygen-containing gas supply passage 34a to the oxygen-containing gas discharge passage 34b. According to the present embodiment, the flow field widthwise direction of the oxygen-containing gas flow field 48 is a direction (in the direction of the arrow C) along the short side of the rectangular first metal separator 30. The first bypass stopping convex portions 84 are formed to protrude toward the resin frame member equipped MEA 28 (see FIG. 2). A plurality of the first bypass stopping convex portions 84 are arranged at intervals in the direction (the direction of the arrow B) in which the end linear protrusions 48a1 extend. The height of the first bypass stopping convex portions 84 is lower than the height of the outer peripheral bead 54 in a state prior to assembly.

Figure 4:
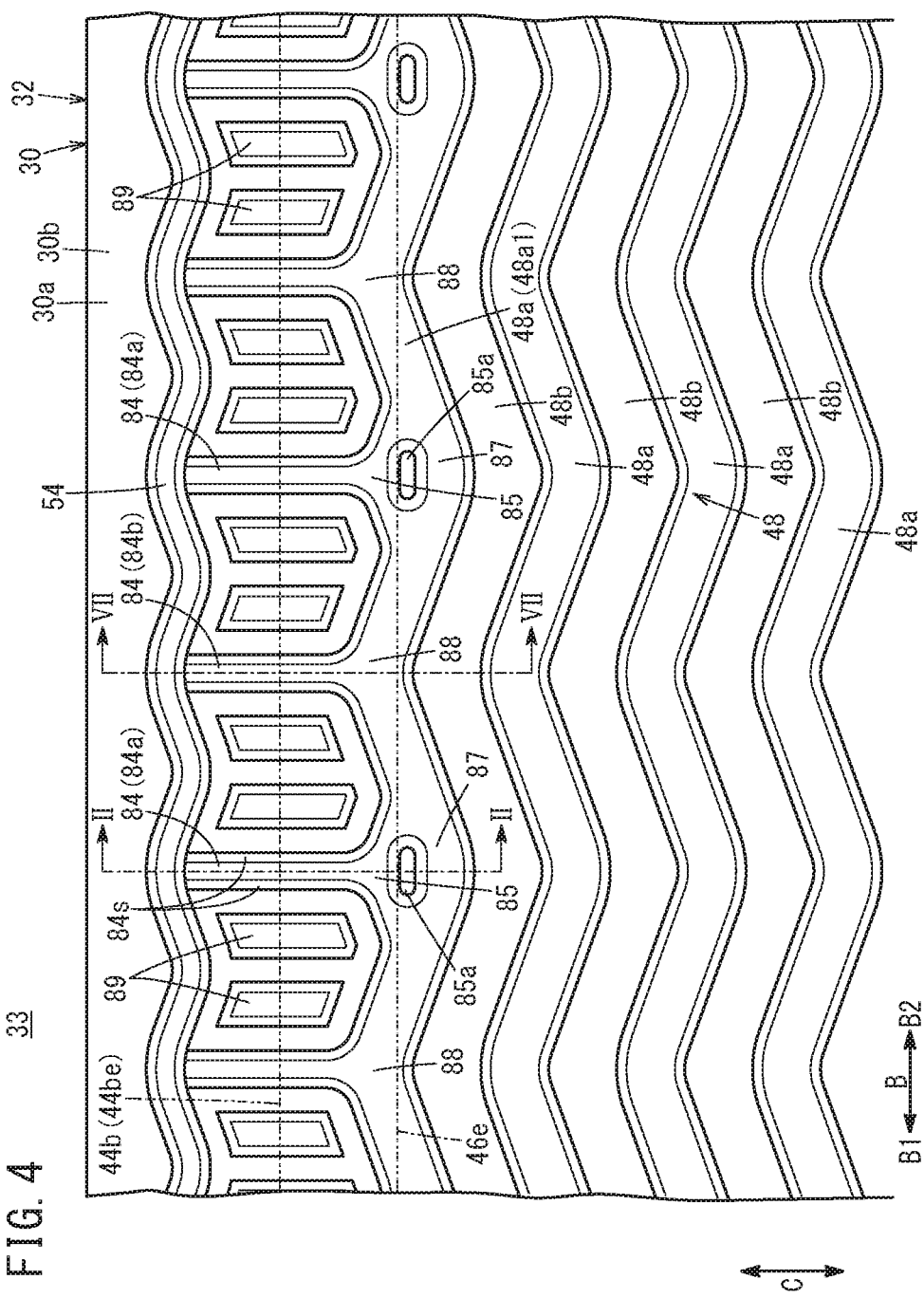
FIG. 4 is an enlarged plan view of principal parts of the first metal separator.

In FIG. 4, side walls 84s on both sides in the widthwise direction (the direction of the arrow B) of the first bypass stopping convex portions 84 are inclined with respect to the thickness direction of the separators, and the cross-sectional shape of the first bypass stopping convex portions 84 is trapezoidal. The side walls 84s on both sides in the widthwise direction of the first bypass stopping convex portions 84 may be parallel with respect to the thickness direction of the separators, and the cross-sectional shape of the first bypass stopping convex portions 84 may be rectangular.

The end linear protrusions 48a1 have concave curved portions 87 which are curved so as to be recessed with respect to the outer peripheral bead 54, and convex curved portions 88 which are curved in a projecting manner toward the outer peripheral bead 54. The plurality of first bypass stopping convex portions 84 include first bypass stopping convex portions 84a provided between the concave curved portions 87 of the end linear protrusions 48a1 and the outer peripheral bead 54, and first bypass stopping convex portions 84b provided between the convex curved portions 88 of the end linear protrusions 48a1 and the outer peripheral bead 54. The first bypass stopping convex portions 84a and the first bypass stopping convex portions 84b are arranged alternately at intervals mutually along the direction in which the end linear protrusions 48a1 extend.

The ones of the first bypass stopping convex portions 84a are connected at one end thereof to the outer peripheral bead 54, and are connected at the other end thereof to the concave curved portions 87 of the end linear protrusions 48a1. The others of the first bypass stopping convex portions 84b are connected at one end thereof to the outer peripheral bead 54, and are connected at the other end thereof to the convex curved portions 88 of the end linear protrusions 48a1. Intermediate convex portions 89 that support the outer peripheral portion of the MEA 28a are provided between mutually adjacent ones of the first bypass stopping convex portions 84a, 84b.

The intermediate convex portions 89 protrude toward the resin frame member equipped MEA 28. The height of the intermediate convex portions 89 is the same as the height of the first bypass stopping convex portions 84a. The intermediate convex portions 89 have shapes extending in a direction intersecting with the linear protrusions 48a. The intermediate convex portions 89 are arranged in plurality individually between mutually adjacent ones of the first bypass stopping convex portions 84a, 84b. More specifically, as shown in FIG. 4, between the mutually adjacent first bypass stopping convex portions 84a, 84b, the intermediate convex portions 89 are arranged with intervals being placed along the direction in which the end linear protrusions 48a1 extend. The intermediate convex portions 89 are disposed at positions overlapping the outer peripheral portion 44out including the outer edge 44be of the first gas diffusion layer 44b when viewed from the stacking direction.

In the first metal separator 30, between the concave curved portions 87 of the end linear protrusions 48a1 and the first bypass stopping convex portions 84a, first supporting convex portions 85 are provided for supporting the cathode 44 (first gas diffusion layer 44b). The first supporting convex portions 85 are formed by press forming to protrude toward the resin frame member equipped MEA 28. According to the present embodiment, the first supporting convex portions 85 are connected integrally with the first bypass stopping convex portions 84a, together with being connected integrally with the concave curved portions 87 of the end linear protrusions 48a1.

As shown in FIG. 2, the first supporting convex portions 85 support the cathode 44 (the first gas diffusion layer 44b) at positions where the MEA 28a and the resin frame member 46 overlap in the thickness direction. As shown in FIG. 3, the first supporting convex portions 85 are formed at positions corresponding to the inner peripheral portion 46in of the frame-shaped resin frame member 46 (the inner peripheral portion 46in of the resin frame member 46 as viewed from the stacking direction).

As shown in FIG. 4, the first supporting convex portions 85 have concave portions 85a therein, which are recessed with respect to the cathode 44. The concave portions 85a are disposed on lines of extension of the first bypass stopping convex portions 84a. The concave portions 85a are provided corresponding to the plurality of first supporting convex portions 85. More specifically, the plurality of concave portions 85a are disposed along the directions in which the end linear protrusions 48a1 extend.

Figure 5:
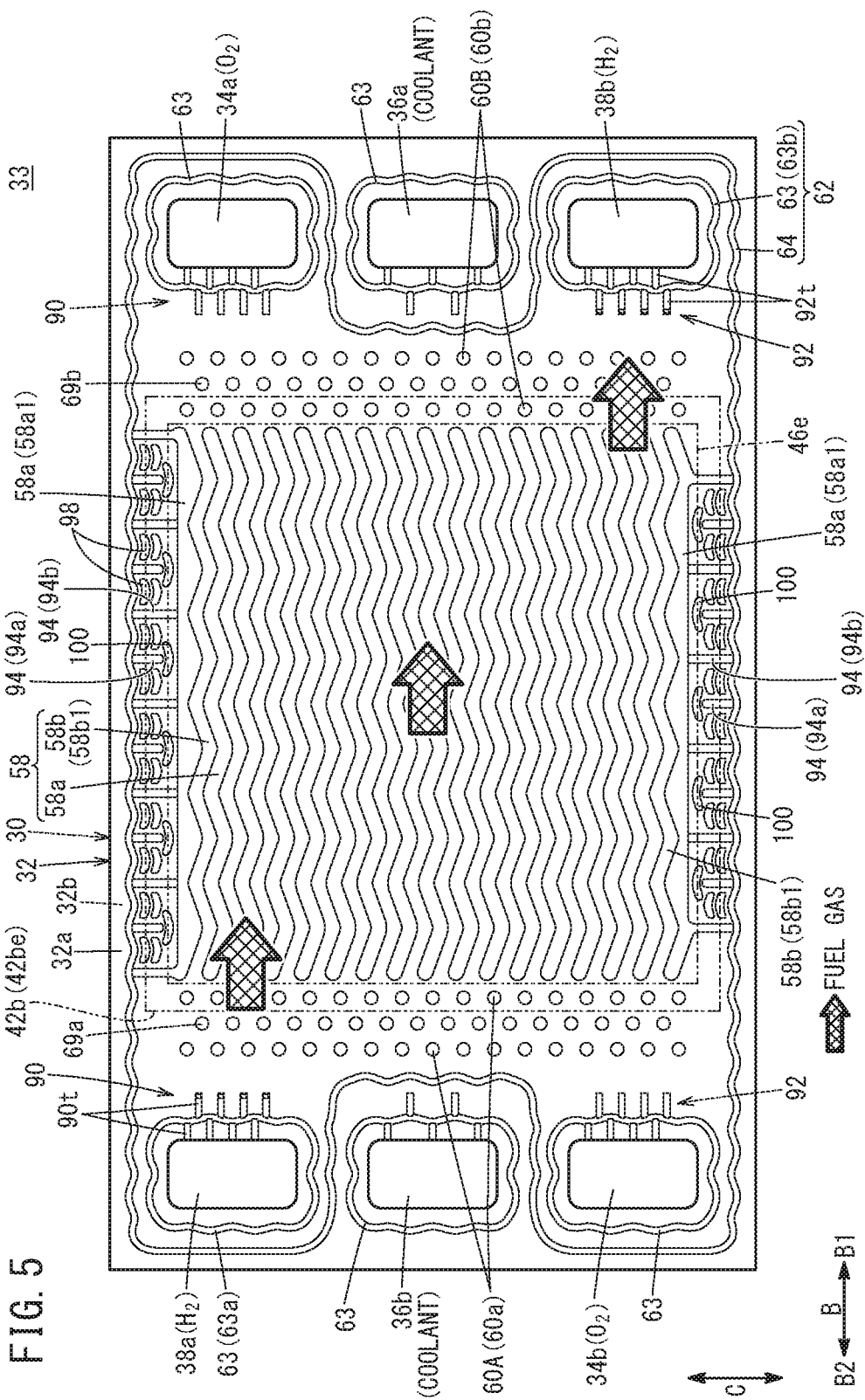
FIG. 5 is a plan view of the power generating cell as viewed from the side of a second metal separator.

As shown in FIG. 5, a fuel gas flow field 58 extending in the direction of the arrow B, for example, is disposed on a surface 32a (referred to hereinafter as a "front surface 32a") of the second metal separator 32 facing toward the resin frame member equipped MEA 28.

The fuel gas flow field 58 communicates fluidically with the fuel gas supply passage 38a and the fuel gas discharge passage 38b. The fuel gas flow field 58 includes a plurality of wave-shaped linear flow field grooves 58b disposed between a plurality of wave-shaped linear protrusions 58a that extend in the direction of the arrow B. Accordingly, in the fuel gas flow field 58, a plurality of the linear protrusions 58a and a plurality of the linear flow field grooves 58b are alternately arranged in the flow field widthwise direction (the direction of the arrow C). Each of the linear protrusions 58a and each of the linear flow field grooves 58b extend in wavy shapes, but may extend in a straight line shape.

Side walls on both sides in the widthwise direction (the direction of the arrow C) of the linear protrusions 58a are inclined with respect to the thickness direction of the separators, and the cross-sectional shape of the linear protrusions 58a is trapezoidal. The side walls on both sides in the widthwise direction of the linear protrusions 58a may be parallel to the thickness direction of the separators, and the cross-sectional shape of the linear protrusions 58a may be rectangular.

Hereinafter, among the plurality of linear protrusions 58a, those which are positioned at both ends in the flow field widthwise direction will be referred to as "end linear protrusions 58a1". Further, among the plurality of linear flow field grooves 58b, those which are positioned at both ends in the flow field widthwise direction will be referred to as "end linear flow field grooves 58b1". The end linear protrusions 58a1 are disposed inside of a boundary 43 between the central surface 42s2 of the anode 42 and the stepped portion 42s3 (see FIG. 6).

On the front surface 32a of the second metal separator 32, an inlet buffer 60A having a plurality of boss arrays composed of a plurality of bosses 60a aligned in the direction of the arrow C is disposed between the fuel gas supply passage 38a and the fuel gas flow field 58. Further, on the front surface 32a of the second metal separator 32, an outlet buffer 60B having a plurality of boss arrays composed of a plurality of bosses 60b is disposed between the fuel gas discharge passage 38b and the fuel gas flow field 58.

Moreover, on a surface 32b of the second metal separator 32 on an opposite side from the fuel gas flow field 58, boss arrays composed of a plurality of bosses 69a aligned in the direction of the arrow C are provided between the above-described boss arrays of the inlet buffer 60A, and together therewith, boss arrays composed of a plurality of bosses 69b aligned in the direction of the arrow C are provided between the above-described boss arrays of the outlet buffer 60B. The bosses 69a, 69b constitute buffer sections on the side of the coolant surface.

Second seal lines 62, which are formed by press forming, are formed to project or bulge out toward the resin frame member equipped MEA 28 on the front surface 32a of the second metal separator 32. The second seal lines 62 need not necessarily be bead seals, but may be rubber seals having elasticity, which are integrally or separately provided on the second metal separator 32. Although not shown in detail, on a projecting end surface of the second seal lines 62, a resin material is fixed and attached thereto by printing or coating, etc. Such a resin material need not necessarily be used.

As shown in FIG. 5, the second seal lines 62 include a plurality of bead seals (hereinafter referred to as "passage beads 63") that individually surround the plurality of communication passages (the fuel gas supply passage 38a, etc.), and a bead seal (hereinafter referred to as an "outer peripheral bead 64") that surrounds the fuel gas flow field 58, the inlet buffer 60A, and the outlet buffer 60B.

The plurality of passage beads 63 project out from the front surface 32a of the second metal separator 32, together with individually surrounding, respectively, the oxygen-containing gas supply passage 34a, the oxygen-containing gas discharge passage 34b, the fuel gas supply passage 38a, the fuel gas discharge passage 38b, the coolant supply passage 36a, and the coolant discharge passage 36b. Hereinafter, among the plurality of passage beads 63, the one that surrounds the fuel gas supply passage 38a will be referred to as a "passage bead 63a", and the one that surrounds the fuel gas discharge passage 38b will be referred to as a "passage bead 63b".

On the second metal separator 32, bridge sections 90, 92 are provided, which enable communication between inner sides (on the sides of the fuel gas supply passage 38a and the fuel gas discharge passage 38b) and outer sides (on the side of the fuel gas flow field 58) of the passage beads 63a, 63b that surround the fuel gas supply passage 38a and the fuel gas discharge passage 38b, respectively. The bridge sections 90 are provided on a side portion of the passage bead 63a surrounding the fuel gas supply passage 38a on the side of the fuel gas flow field 58. The bridge sections 92 are provided at intervals on a side portion of the passage bead 63b surrounding the fuel gas discharge passage 38b on the side of the fuel gas flow field 58.

The bridge sections 90, 92 include a plurality of tunnels 90t, 92t provided respectively on the inside and the outside of the passage beads 63a, 63b. The tunnels 90t, 92t are formed by press forming to protrude from the front surface 32a of the second metal separator 32 and toward the resin frame member equipped MEA 28 (see FIG. 2).

Between both end portions in the flow field widthwise direction (the end linear protrusions 58a1) of the fuel gas flow field 58 and the outer peripheral bead 64, second bypass stopping convex portions 94 are provided for preventing bypassing of the fuel gas from the fuel gas supply passage 38a to the fuel gas discharge passage 38b. According to the present embodiment, the flow field widthwise direction of the fuel gas flow field 58 is a direction (in the direction of the arrow C) along the short side of the rectangular second metal separator 32. The second bypass stopping convex portions 94 are formed to protrude toward the resin frame member equipped MEA 28 (see FIG. 2). A plurality of the second bypass stopping convex portions 94 are arranged at intervals in the direction (the direction of the arrow B) in which the linear flow field grooves 58b extend.

Figure 6:
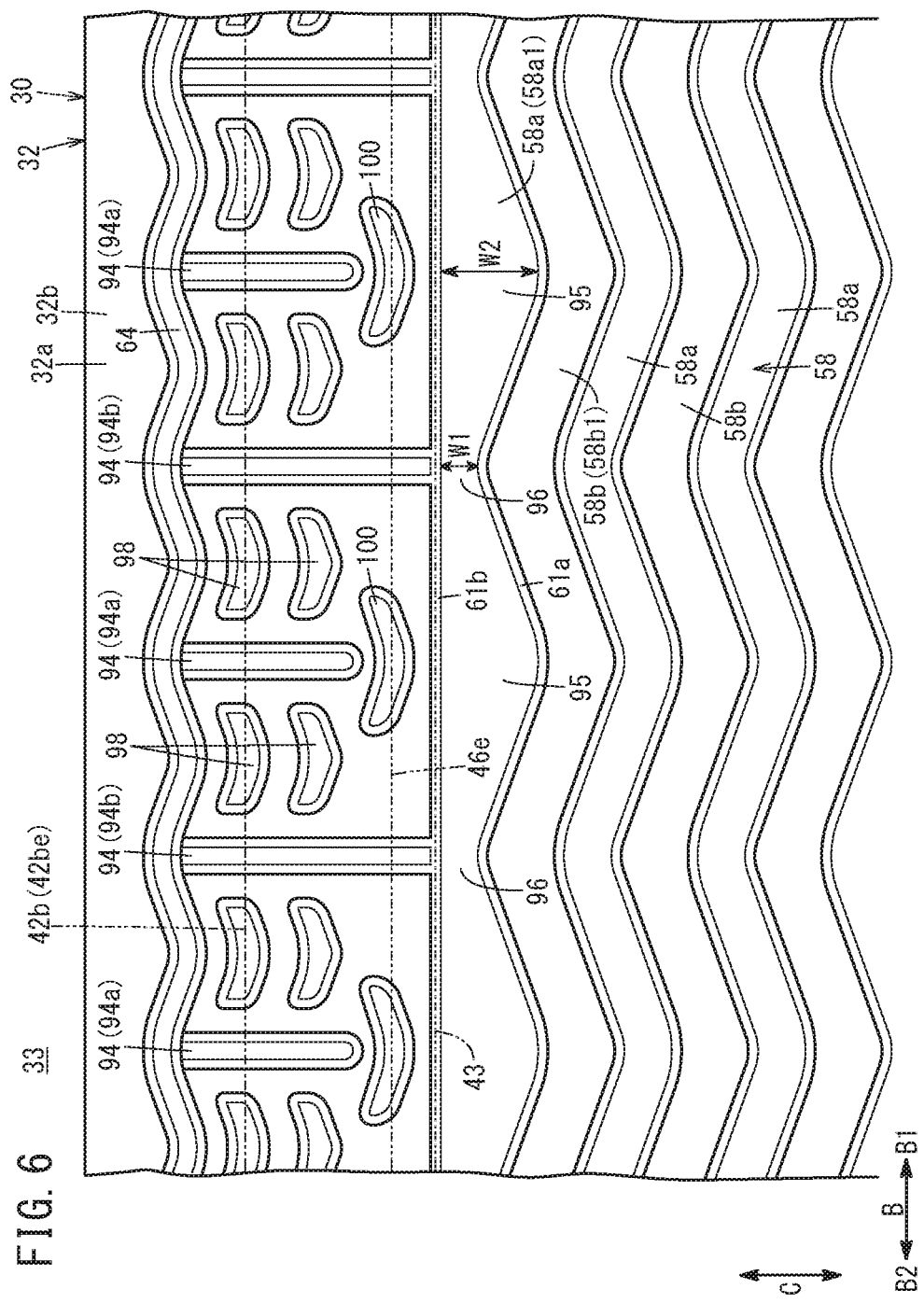
FIG. 6 is an enlarged plan view of principal parts of the second metal separator.

As shown in FIG. 6, the end linear protrusions 58a1 are located inwardly of the stepped portion 42s3 of the anode 42. More specifically, as shown in FIGS. 2 and 7, protruding end surfaces 59 of the end linear protrusions 58a1 are in contact with the central surface 42s2, without contacting the outer peripheral surface 42s1 of the anode 42 over the entire length thereof. The protruding end surfaces 59 of the end linear protrusions 58a1 are positioned in the vicinity of the boundary 43 between the central surface 42s2 of the anode 42 and the stepped portion 42s3.

First side walls 61a of the end linear protrusions 58a1 near the linear flow field grooves 58b extend in a wavy shape along the linear flow field grooves 58b. Second side walls 61b of the end linear protrusions 58a1 opposite from the linear flow field grooves 58b extend in a straight line shape along the boundary 43 between the central surface 42s2 of the anode 42 and the stepped portion 42s3. More specifically, a width dimension (a dimension along the direction of the arrow C) of the protruding end surfaces 59 of the end linear protrusions 58a1 varies in the direction of extension (the direction of the arrow B) thereof.

The end linear protrusions 58a1 have concave curved portions 95 which are curved so that the first side walls 61a thereof are recessed with respect to the outer peripheral bead 64, and convex curved portions 96 which are curved so that the first side walls 61a thereof are curved in a projecting manner toward the outer peripheral bead 64. A width dimension W1 between the convex curved portions 96 and the second side walls 61b is smaller than the width dimension W2 between the concave curved portions 95 and the second side walls 61b. More specifically, the width dimension W1 of the convex curved portions 96 is a minimum width dimension of the end linear protrusions 58a1, and the width dimension W2 of the concave curved portions 95 is a maximum width dimension of the end linear protrusions 58a1.

The height of the second bypass stopping convex portions 94 is lower than the height of the outer peripheral bead 64 in a state prior to assembly. The plurality of second bypass stopping convex portions 94 include second bypass stopping convex portions 94a provided between the concave curved portions 95 of the end linear protrusions 58a1 and the outer peripheral bead 64, and second bypass stopping convex portions 94b provided between the convex curved portions 96 of the end linear protrusions 58a1 and the outer peripheral bead 64. The ones of the second bypass stopping convex portions 94a and the others of the second bypass stopping convex portions 94b are arranged alternately at intervals mutually along the direction in which the end linear protrusions 58a1 extend.

The ones of the second bypass stopping convex portions 94a are connected at one end thereof to the outer peripheral bead 64, and are separated at the other end thereof from the concave curved portions 95 of the end linear protrusions 58a1. The others of the second bypass stopping convex portions 94b are connected at one end thereof to the outer peripheral bead 64, and are connected at the other end thereof to the convex curved portions 96 of the end linear protrusions 58a1. Intermediate convex portions 98 that support the outer peripheral portion of the MEA 28a are provided between mutually adjacent ones of the second bypass stopping convex portions 94a, 94b. The intermediate convex portions 98 protrude toward the resin frame member equipped MEA 28. The height of the intermediate convex portions 98 is the same as the height of the second bypass stopping convex portions 94.

The intermediate convex portions 98 are arranged in plurality individually between mutually adjacent ones of the second bypass stopping convex portions 94a, 94b. The arrangement direction of the plurality of intermediate convex portions 98 that are provided between the mutually adjacent second bypass stopping convex portions 94a, 94b differs from the arrangement direction of the plurality of intermediate convex portions 89 (see FIG. 4) that are provided between the mutually adjacent first bypass stopping convex portions 84a, 84b. More specifically, in the present embodiment, between the mutually adjacent second bypass stopping convex portions 94a, 94b, the plurality of intermediate convex portions 98 are arranged with intervals being placed along the direction of separation (the direction of the arrow C) between the end linear protrusions 58a1 and the outer peripheral bead 64. The intermediate convex portions 98 are disposed at positions overlapping the outer peripheral portion 42out including an outer edge 42be of the second gas diffusion layer 42b when viewed from the stacking direction.

In the second metal separator 32, between the concave curved portions 95 of the end linear protrusions 58a1 and the second bypass stopping convex portions 94a, second supporting convex portions 100 are provided for supporting the anode 42 (second gas diffusion layer 42b). The second supporting convex portions 100 are formed by press forming to protrude toward the resin frame member equipped MEA 28. The height of the second supporting convex portions 100 is the same as the height of the intermediate convex portions 98.

The second supporting convex portions 100 have a shape that differs from that of the first supporting convex portions 85 (FIG. 4). According to the present embodiment, the second supporting convex portions 100 are arranged so as to be separated from the concave curved portions 95 of the end linear protrusions 58a1 and the second bypass stopping convex portions 94a. Moreover, the second supporting convex portions 100 may be formed so as to be connected integrally with at least one of the concave curved portions 95 of the end linear protrusions 58a1 and the second bypass stopping convex portions 94a.

The second supporting convex portions 100 are formed at positions corresponding to the inner peripheral portion 46in of the frame-shaped resin frame member 46 (the inner peripheral portion 46*in* of the resin frame member 46 as viewed from the stacking direction). As shown in FIG. 7, the second supporting convex portions 100 support the anode 42 (the second gas diffusion layer 42*b*) at positions where the outer peripheral portion of the MEA 28*a* and the inner peripheral portion 46*in* of the resin frame member 46 overlap in the thickness direction.

As viewed from the stacking direction, the linear protrusions 48*a* of the oxygen-containing gas flow field 48 and the linear protrusions 58*a* of the fuel gas flow field 58 are formed in wavy shapes of the same wavelength and which are mutually opposite in phase. The first supporting convex portions 85 of the first metal separator 30 and the second supporting convex portions 100 of the second metal separator 32 are arranged alternately along the direction in which the linear protrusions 58*a* extend.

As shown in FIG. 1, a coolant flow field 66 is formed between the surface 30*b* of the first metal separator 30 and the surface 32*b* of the second metal separator 32. The coolant flow field 66 is connected to and communicates fluidically with the coolant supply passage 36*a* and the coolant discharge passage 36*b*. The coolant flow field 66 is formed by stacking and matching together the back surface of the first metal separator 30 on which the oxygen containing gas flow field 48 is formed, and the back surface of the second metal separator 32 on which the fuel gas flow field 58 is formed.

The power generating cell 10, which is configured as described above, operates in the following manner.

First, as shown in FIG. 1, an oxygen-containing gas, for example air, is supplied to the oxygen-containing gas supply passage 34*a*. A fuel gas such as a hydrogen-containing gas or the like is supplied to the fuel gas supply passage 38*a*. Further, a coolant such as pure water, ethylene glycol, or oil is supplied to the coolant supply passage 36*a*.

The oxygen-containing gas flows from the oxygen-containing gas supply passage 34*a* into the oxygen-containing gas flow field 48 of the first metal separator 30. In addition, as shown in FIG. 3, the oxygen-containing gas moves along the oxygen-containing gas flow field 48 in the direction of the arrow B, and the oxygen-containing gas is supplied to the cathode 44 of the MEA 28*a*.

Meanwhile, as shown in FIG. 1, the fuel gas flows from the fuel gas supply passage 38*a* into the fuel gas flow field 58 of the second metal separator 32. As shown in FIG. 5, the fuel gas moves in the direction of the arrow B along the fuel gas flow field 58, and is supplied to the anode 42 of the MEA 28*a*.

Accordingly, in each of the MEAs 28*a*, the oxygen-containing gas, which is supplied to the cathode 44, and the fuel gas, which is supplied to the anode 42, are partially consumed in electrochemical reactions that take place in the first electrode catalyst layer 44*a* and the second electrode catalyst layer 42*a*, thereby generating electricity.

Next, as shown in FIG. 1, the oxygen-containing gas, which is supplied to and partially consumed at the cathode 44, flows from the oxygen-containing gas flow field 48 to the oxygen-containing gas discharge passage 34*b*, and the oxygen-containing gas is discharged in the direction of the arrow A toward the oxygen-containing gas discharge passage 34*b*. In the same way, the fuel gas, which is supplied to and partially consumed at the anode 42, flows from the fuel gas flow field 58 to the fuel gas discharge passage 38*b*, and the fuel gas is discharged in the direction of the arrow A toward the fuel gas discharge passage 38*b*.

Further, the coolant that is supplied to the coolant supply passage 36*a* flows into the coolant flow field 66 between the first metal separator 30 and the second metal separator 32, and thereafter, the coolant flows in the direction of the arrow B. After the coolant has cooled the MEA 28*a*, the coolant is discharged from the coolant discharge passage 36*b*.

In this case, the power generating cell 10 according to the present embodiment exhibits the following effects.

As shown in FIGS. 2 and 7, in the power generating cell 10, on the surface 42*s* on a side opposite from the electrolyte membrane 40 in the anode 42, there are provided the outer peripheral surface 42*s*1 positioned on the outer peripheral portion 42*out* of the anode 42, the central surface 42*s*2 located more inwardly than the inner end 46*e* of the resin frame member 46, and the stepped portion 42*s*3 connecting the outer peripheral surface 42*s*1 and the central surface 42*s*2 to each other. A height of the central surface 42*s*2 from the electrolyte membrane 40 is lower than that of the outer peripheral surface 42*s*1. The protruding end surface 59 of the end linear protrusion 58*a*1 is in contact with the central surface 42*s*2.

Therefore, gaps that act as bypass flow passages are not formed between the protruding end surface 59 of the end linear protrusion 58*a*1 and the central surface 42*s*2 of the anode 42. Thus, bypassing of the fuel gas (reaction gas) that flows inside the end linear flow field grooves 58*b*1 can be prevented. Consequently, it is possible to suppress a decrease in the flow rate of the fuel gas inside the end linear flow field grooves 58*b*1.

The protruding end surface 59 of the end linear protrusion 58*a*1 is in contact with the central surface 42*s*2 over the entire length of the end linear protrusion 58*a*1. Therefore, bypassing of the fuel gas inside the end linear flow field grooves 58*b*1 can be reliably prevented.

The protruding end surface 59 of the end linear protrusion 58*a*1 is positioned in the vicinity of the boundary 43 between the central surface 42*s*2 and the stepped portion 42*s*3. Consequently, since the contact area between the protruding end surface 59 of the end linear protrusion 58*a*1 and the central surface 42*s*2 can be made comparatively wide, it is possible to reliably prevent bypassing of the fuel gas inside the end linear flow field grooves 58*b*1.

As shown in FIGS. 5 and 6, each of the linear flow field grooves 58*b* extends in a wavy shape. The first side wall 61*a* of the end linear protrusion 58*a*1 near the linear flow field grooves 58*b* extends in a wavy shape along the linear flow field grooves 58*b*. The second side wall 61*b* of the end linear protrusion 58*a*1 opposite from the linear flow field grooves 58*b* extends in a straight line shape along the boundary 43. Therefore, by a simple configuration, it is possible to lengthen the flow passage length of the fuel gas, together with reliably preventing bypassing of the fuel gas inside the end linear flow field grooves 58*b*1.

On at least one of the metal separators (the second metal separator 32), the bypass stopping convex portion (second bypass stopping convex portion 94), which is configured to prevent bypassing of the reaction gas (fuel gas), is provided between the seal (outer peripheral bead 64) and the end linear protrusion 58*a*1, and is in contact with the outer peripheral surface 42*s*1. Consequently, bypassing of the reaction gas (fuel gas) inside the end linear flow field grooves 58*b*1 can be reliably prevented.

The end linear protrusion 58*a*1 has the concave curved portion 95 in which the first side wall 61*a* thereof is curved so as to be recessed with respect to the seal (outer peripheral bead 64), and the convex curved portion 96 in which the first side wall 61*a* is curved in a projecting manner toward the seal (outer peripheral bead 64). On the metal separator (the second metal separator 32) facing toward the one electrode (the anode 42), the bypass stopping convex portion (second bypass stopping convex portion 94), which is configured to prevent bypassing of the reaction gas (fuel gas), is provided between the seal (outer peripheral bead 64) and the end linear protrusion 58$a$1 and is in contact with the outer peripheral surface 42$s$1. The bypass stopping convex portion (second bypass stopping convex portion 94) includes the first convex portion (second bypass stopping convex portion 94$a$) provided between the seal (outer peripheral bead 64) and the concave curved portion 95, and the second convex portion (second bypass stopping convex portion 94$b$) provided between the seal (outer peripheral bead 64) and the convex curved portion 96.

In accordance with these features, bypassing of the reaction gas (fuel gas) inside the end linear flow field grooves 58$b$1 can be more reliably prevented.

The first convex portion (second bypass stopping convex portion 94$a$) is connected to the seal (outer peripheral bead 64). In this case, by the first convex portion (second bypass stopping convex portion 94$a$), it is possible to effectively prevent bypassing of the reaction gas (fuel gas) inside the end linear flow field grooves 58$b$1.

The second convex portion (second bypass stopping convex portion 94$b$) is connected respectively to the seal (outer peripheral bead 64) and to the end linear protrusion 58$a$1. In this case, by the second convex portion (second bypass stopping convex portion 94$b$), it is possible to effectively prevent bypassing of the reaction gas (fuel gas) inside the end linear flow field grooves 58$b$1.

The intermediate convex portion 98 configured to support the outer peripheral portion of the MEA 28 is provided between the first convex portion (second bypass stopping convex portion 94$a$) and the second convex portion (second bypass stopping convex portion 94$b$). In this case, by the intermediate convex portion 98, it is possible to effectively prevent bypassing of the reaction gas (fuel gas) inside the end linear flow field grooves 58$b$1.

The present invention is not limited to the configuration described above. The linear protrusions 58$a$ and the linear flow field grooves 58$b$ may extend in a straight line shape from one end to the other end of the second metal separator 32. The end linear protrusions 58$a$1 may be positioned on the boundary 43 between the central surface 42$s$2 of the anode 42 and the stepped portion 42$s$3.

In the present embodiment, the stepped portion 42$s$3 is provided on the surface 42$s$ of the anode 42, however, a stepped portion may be provided on the surface 44$s$ of the cathode 44. In this case, the stepped portion mutually connects an outer peripheral surface positioned on the outer peripheral portion 44$out$ of the cathode 44, and a central surface positioned more inwardly than the inner end 46$e$ of the resin frame member 46. In addition, the central surface is positioned more closely to the side of the anode 42 than the outer peripheral surface. In addition, the protruding end surfaces of the end linear protrusions 48$a$1 are placed in contact with a central surface on the surface 42$s$ of the anode 42. Further, in the case that the stepped portion is provided on the cathode 44, the stepped portion 42$s$3 of the anode 42 may be omitted or may be left remaining.

The present invention is not limited to the embodiment described above, and various modifications may be made thereto without deviating from the essential scope of the present invention as set forth in the appended claims.

What is claimed is:

1. A power generating cell comprising a membrane electrode assembly on which electrodes are provided on both sides of an electrolyte membrane, metal separators disposed on both sides of the membrane electrode assembly, and a resin frame member protruding outwardly from outer peripheral portions of the electrodes and surrounding the outer peripheral portions of the electrodes in a state of being sandwiched between the outer peripheral portion of one of the electrodes and the outer peripheral portion of another of the electrodes; wherein the one of the electrodes is one of an anode or a cathode, and the another of the electrodes is the other of the anode or cathode;
   wherein reaction gas flow fields are formed therein having a plurality of linear protrusions extending from one end to another end of the metal separators, and a plurality of linear flow field grooves formed between the plurality of linear protrusions, and which are configured to allow reaction cases to flow along power generating surfaces thereof from the one end to the other end; and
   in the power generating cell, a seal is provided to surround the reaction gas flow fields and are configured to prevent leakage of the reaction gases;
   wherein on a surface on an opposite side from the electrolyte membrane on one the electrodes, there are provided:
   an outer peripheral surface positioned on the outer peripheral portion of the one of the electrodes;
   a central surface located more inwardly than an inner end of the resin frame member; and
   a stepped portion connecting the outer peripheral surface and the central surface to each other;
   wherein a height of the central surface from the electrolyte membrane is lower than that of the outer peripheral surface;
   wherein among the plurality of linear protrusions, a protruding end surface of an end linear protrusion, which is positioned at an end of the reaction gas flow field in a flow field widthwise direction, is in contact with the central surface; and
   wherein on the metal separator facing toward the one of the electrodes, a bypass stopping convex portion, which is configured to prevent bypassing of the reaction gases, is provided between the seal and the end linear protrusion from the plurality of linear protrusions, and is in contact with the outer peripheral surface;
   the bypass stopping convex portion comprising:
   a first convex portion provided between the seal and a concave curved portion of a first side wall of the end linear protrusion; and
   a second convex portion provided between the seal and a convex curved portion of the first side wall of the end linear protrusion.

2. The power generating cell according to claim 1, wherein the first convex portion is connected to the seal.

3. The power generating cell according to claim 1, wherein the second convex portion is connected respectively to the seal and to the end linear protrusion.

4. The power generating cell according to claim 1, wherein an intermediate convex portion configured to support an outer peripheral portion of the membrane electrode assembly is provided between the first convex portion and the second convex portion.

5. The power generating cell according to claim 1, wherein the protruding end surface of the end linear protrusion is in contact with the central surface over an entire length of the end linear protrusion.

6. The power generating cell according to claim 1, wherein the protruding end surface of the end linear protrusion is positioned adjacent to a boundary between the central surface and the stepped portion.

7. The power generating cell according to claim 6, wherein:
- each of the linear flow field grooves extends in a wavy shape;
- the first side wall of the end linear protrusion is near the linear flow field grooves and extends in a wavy shape along the linear flow field grooves; and
- a second side wall of the end linear protrusion opposite from the linear flow field grooves extends in a straight line shape along the boundary.

8. The power generating cell according to claim 1, wherein the seal is a bead seal which are formed in a bulging manner on the metal separators.

9. The power generating cell according to claim 7, wherein the first side wall is curved in the concave curved portion so as to be recessed with respect to the seal; and wherein the first side wall is curved in the convex curved portion in a projecting manner toward the seal.

\* \* \* \* \*